Feb. 27, 1951            G. H. DOWTY            2,543,233

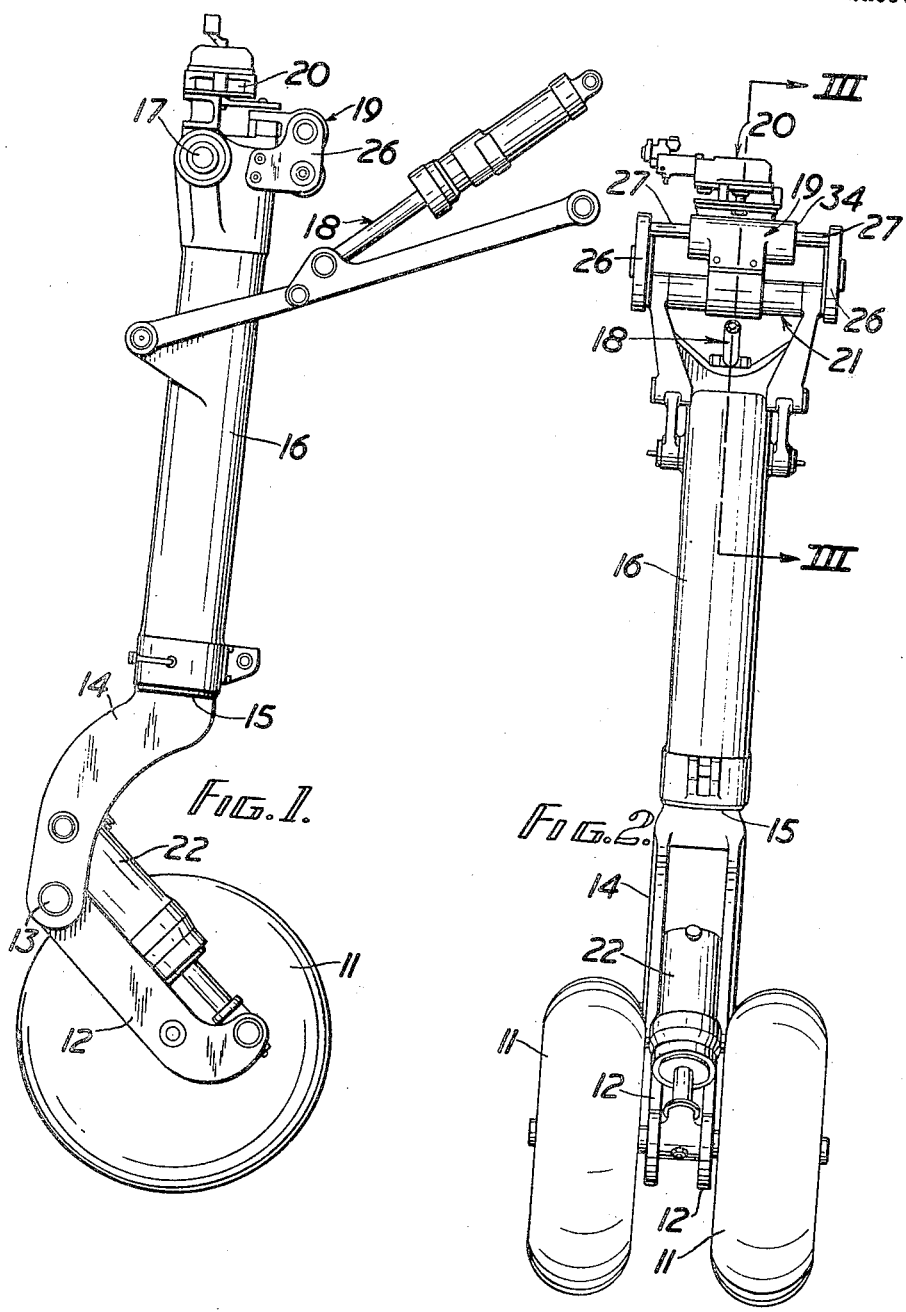

AIRCRAFT NOSE-WHEEL OR TAIL-WHEEL MOUNTING

Filed Aug. 22, 1949            5 Sheets-Sheet 3

Inventor
GEORGE H. DOWTY,
By Reynolds & Beach
Attorneys

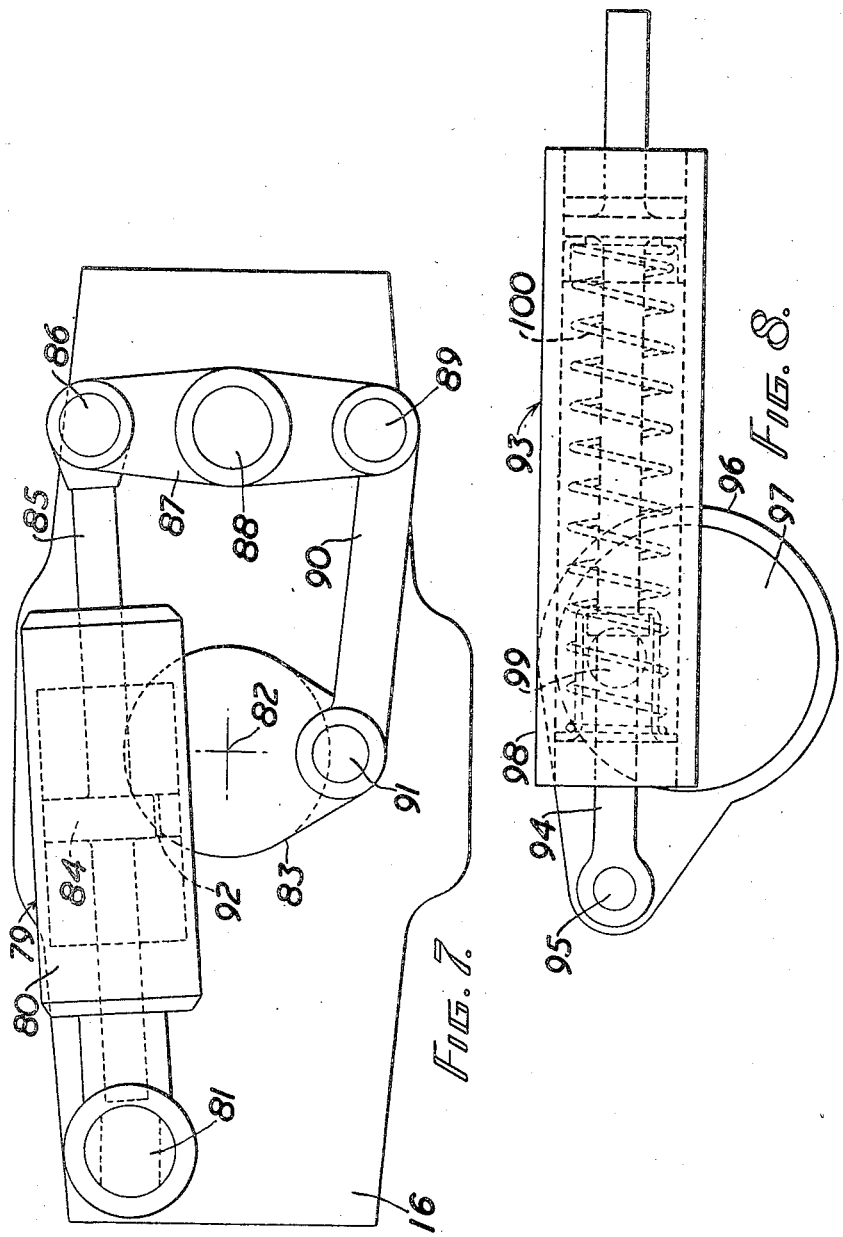

Patented Feb. 27, 1951

2,543,233

UNITED STATES PATENT OFFICE 2,543,233

AIRCRAFT NOSE-WHEEL OR TAIL-WHEEL MOUNTING

George H. Dowty, Cheltenham, England

Application August 22, 1949, Serial No. 111,645
In Great Britain February 24, 1948

12 Claims. (Cl. 244—50)

This invention relates to aircraft nosewheel or tail-wheel mountings which are arranged to be castorable through 360 degrees, and seeks to provide an improved and simplified construction including means for damping shimmy or for both damping shimmy and effecting steering. The mountings may be retractable or fixed and will usually have provision for affording self-alignment in a fore and aft or other track.

According to one feature of this invention, an aircraft castorable and steerable nose-wheel or tail-wheel mounting comprises a single double-acting hydraulic jack the movable element of which is drivingly connected to the upper end of the rotatable part of the mounting eccentrically of the castoring and steering axis so that axial displacement of said element with respect to the fixed element effected by fluid in the fluid pressure system is translated into part rotary steering movements of the mounting part, whilst the fluid pressure system includes a by-pass permitting castoring of the wheel to take place independently of steering.

The by-pass preferably includes a restriction, which may with advantage be adjustable, whereby a certain amount of restraint is afforded to the castoring action. Although such a restricted by-pass may be effective at all times, that is to say when the aircraft is grounded, it may be normally effective and rendered ineffective, as by valve means, wherever steering is taking place.

According to another feature of the invention, an aircraft castorable nose-wheel or tail-wheel mounting comprises a single double-acting hydraulic jack device the movable element of which is drivingly connected to the upper end of the rotatable part of the mounting eccentrically of the castoring axis so that castoring of said rotatable part will be translated into axial displacement of the movable element of the jack device, and the hydraulic system includes a restricted by-pass whereby the jack device functions as a dashpot to damp shimmy.

From the point of view of shimmy damping the restriction of the restricted by-pass may be formed in the piston member of the jack plunger. Where provision is made for steering it is also possible for the restricted by-pass to be effective at all times in which case the restriction may likewise be formed in the piston member of the jack plunger.

In order that the invention may be more clearly understood and readily carried into effect, some embodiments will now be described by way of example with reference to the accompanying drawings; of which:

Figures 1 to 6 illustrate an aircraft castorable and steerable nose-wheel mounting, Figures 1 and 2 being side and rear elevations respectively of the complete mounting, Figure 3 being a sectional side elevation of the upper part of the mounting drawn to an enlarged scale, Figure 4 being a sectional view on the line IV—IV in Figure 3, Figure 5 being a plan view looking down on Figure 3, and Figure 6 being a schematic diagram illustrating the hydraulic system of the mounting;

Figure 7 is a plan view of a modification; and

Figure 8 is a plan view of a further modification.

Figure 3:
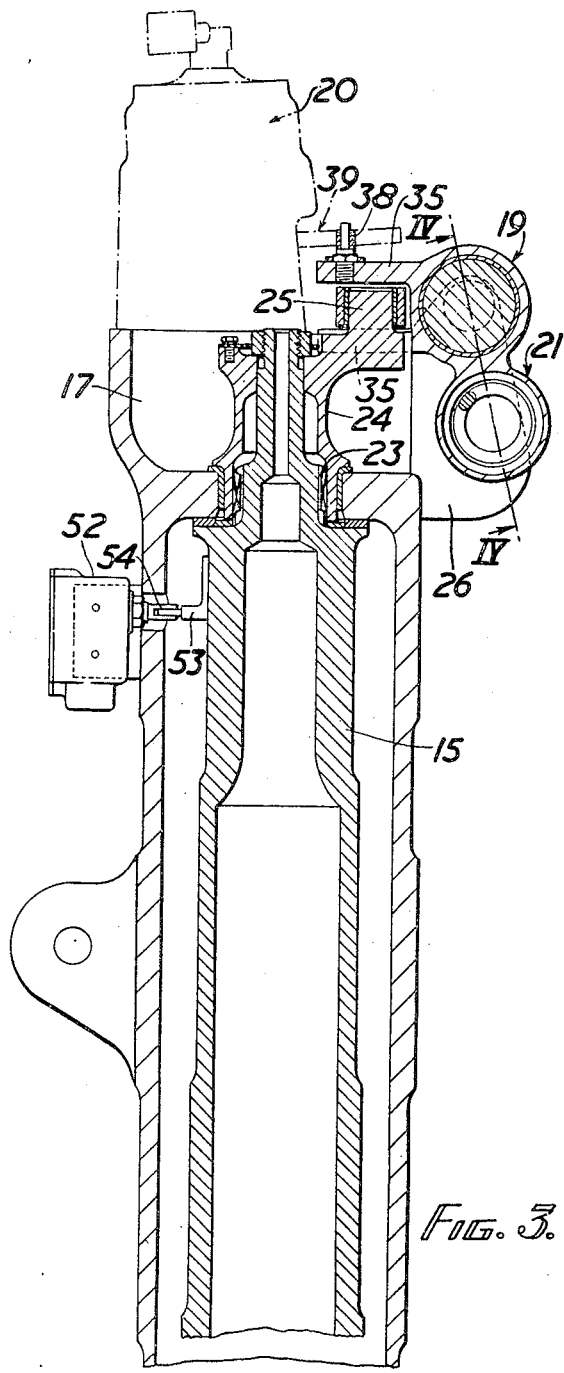

In the nose-wheel mounting shown in Figures 1 to 6, twin wheels 11 are journalled on a lever 12 which is pivoted at 13 to the lower end of a bracket 14 which is rigid with a rotatable shaft or column 15 borne in a non-rotatable support or casing 16. The casing 16 is supported near its upper end in trunnion bearings 17 about which the mounting is retractable by retracting mechanism indicated generally at 18. The upper end of the casing 16 mounts a double-acting hydraulic jack device 19, a control and follow-up valve mechanism 20, and self-centering means 21. A shock absorber 22 is arranged between the lever 12 and bracket 14.

The upper end of the rotatable column 15 (see Figure 3) is in splined connection at 23 with an extension fitting 24 which has an upstanding eccentric pin 25, through which the steering and castoring control over the column 15 is effected. The non-rotatable casing 16 has a pair of integral arms 26 between which there extends a fixed hollow rod 27 formed centrally thereof with a piston 28 (see particularly Figure 4). The piston 28 has two restrictions or openings 29 and 30 extending therethrough, the restriction 29 communicating with the hollow 31 in rod 27 at the one side of the piston 28 and the restriction 30 communicating with the corresponding hollow 32 at the other side of the piston. The arms 26 have unions 33 for connection with the hydraulic system and through which communication is had with the hollow spaces 31 and 32.

The cylinder 34 fits slidably around the piston 28 and is glanded at its ends for sliding on the rod 27. There is integral with the cylinder 34 a pair of lugs 35 between which are pivoted about a pin 36 one end of a link 37 the other end of which link is pivoted around the upstanding pin 25 at the top of the column 15. It will be seen that as the cylinder 34 is caused to slide along the piston rod 27, the linear movement of the cylinder will impart turning movements to the column 15 through the link 37.

The uppermost lug of the pair of lugs 35 carries a roller 38 which co-operates with a forked arm 39 of the control and follow-up valve mechanism 20. The mechanism 20 is of a known kind, and its function will be hereinafter described with reference to Figure 6.

Figure 4:
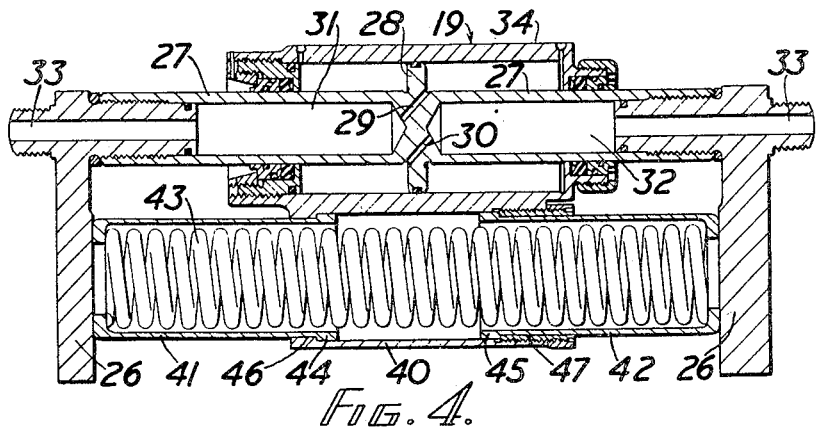
Figure 5:
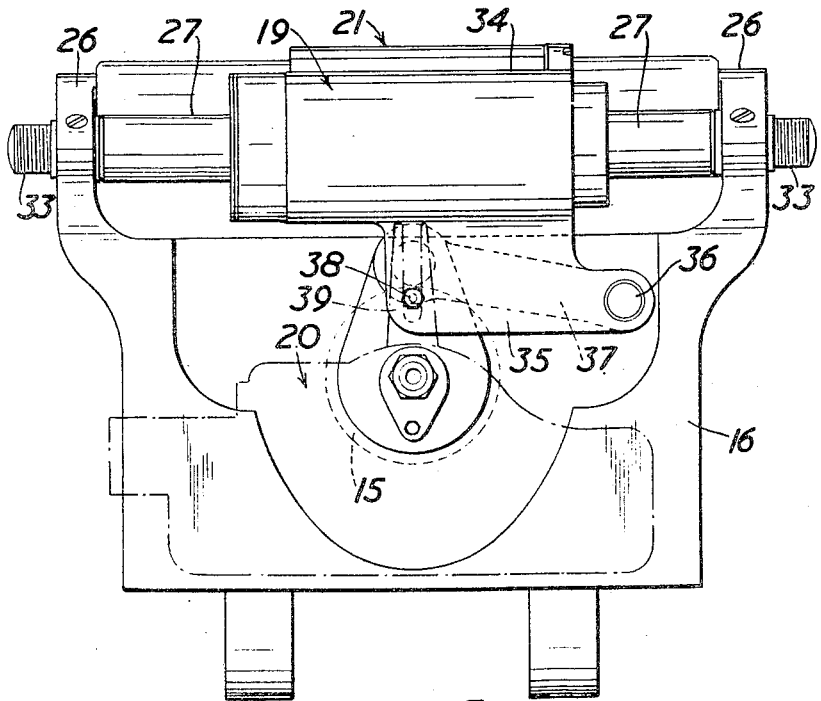

The cylinder 34 has a downward extension 40 of cylindrical form which is adapted to slide on a pair of spring housings 41 and 42 containing a spring 43 extending between the arms 26 of the casing 16. The housings 41 and 42 have shoulders 44 and 45 respectively engaging shoulders 46 and 47 respectively of the extension 40. As the cylinder 34 moves, say to the left as seen in Figure 4, it will slide over the housing 41 and carry with it the housing 42 in order to compress the spring 43 which acts to return the cylinder 34 to its mid position along the rod 27. Similarly when the cylinder moves to the right it compresses the spring 43 by carrying the housing 41 with it. The spring 43 is thus a centering spring which serves to return the wheels 11 into the desired alignment.

Figure 6:
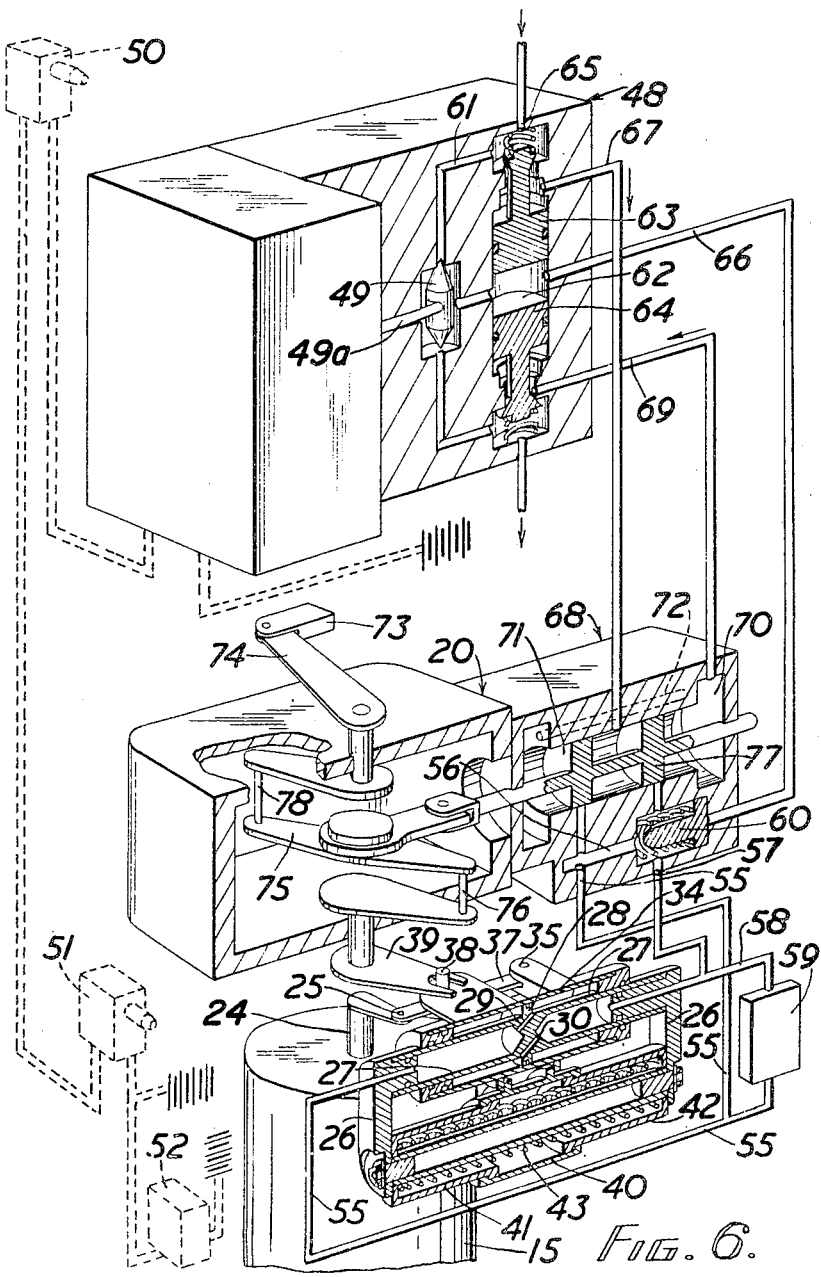

The operation of the mechanism described will be understood from the following description given in conjunction with the diagrammatic representation in Figure 6. The hydraulic system is controlled by a main stop valve unit 48 including a pilot valve 49 controlled electromagnetically through a valve positioning arm 49a. The electrical circuit includes microswitches 50, 51, and 52. When the electrical circuit is completed, an electro-magnet is energised to shift the pilot valve 49 from the one extreme position shown, into which is it normally biased by suitable means (not shown), into the other extreme position. Electro-magnetically controlled valves, sometimes referred to as solenoid valves, are well known devices of which there are various suitable types already available in the art. When the aircraft becomes airborne, the switch 50 breaks the electrical circuit so that the pilot valve 49 will assume the position shown, closing off duct 61, at which the hydraulic system is inoperative so far as steering is concerned. The switch 51 can be caused to make or break under the control of the pilot, and the switch 52 is controlled by the angular disposition of the column 15. This latter switch 52 is shown in Figure 3 and is controlled by a cam surface 53 co-operating with a roller 54. It is to be noted that steering is to be effective throughout a limited range and that beyond this range the hydraulic system is to be ineffective. Thus throughout the steering range the cam surface 53 will allow the switch 52 to close, and beyond this range will break the switch and hence break the electrical circuit of the pilot valve electro-magnet. When the electrical circuit is broken and the pilot valve 49 is biased into the position shown, opposite ends of the hollow piston rod 27 communicate through a by-pass passage-way including conduits 55, 56, and 57. Thus when the cylinder 34 moves as a result of castoring rotation of the column 15, the hydraulic fluid will be able to circulate round a first by-pass passage or circuit including the restrictions 29 and 30 in the piston 28. These restrictions 29 and 30 will therefore operate as damping orifices to damp out any shimmy that may tend to develop. A second by-pass 58 between the conduits 57 and 55 includes a two-way pressure relief valve 59 which serves to prevent excessive pressures being generated by sudden shock loads. The first by-pass passage-way is adapted to be closed by a by-pass valve 60 but this valve remains open under the influence of its spring so long as the pilot valve 49 is in the position shown.

When the electrical circuit is completed, as by closure of all three switches, 50, 51 and 52, the pilot valve 49 will move to the other extreme position and open a conduit 61 to the space 62 between a pair of piston valves 63 and 64. Pressure from the aircraft hydraulic system enters the stop valve unit at 65 and forces the piston valves 63 and 64 apart to open their seatings. Pressure fluid can then flow from 65 along the conduits 61 and 66 to the end of the by-pass valve 60 in order to shift the latter against its spring to close the section 56 of the first by-pass passage-way. The hydraulic fluid can also flow from 65 across the now open piston valve 63 and along the delivery conduit 67 to the control valve 68. A return conduit 69 from the control valve is now open to the reservoir across the seating of the piston valve member 64. The conduit 69 communicates with the spaces 70 and 71 of the control valve through a cross conduit 72. Unless the pilot elects to steer the mounting, the control valve closes the delivery conduit 67. When the pilot wishes to steer the mounting he moves the steering rod 73 to rock the arm 74 of the follow-up valve in the appropriate direction. As the by-pass valve 60 has now closed the by-pass passage-way, the cylinder 34 is hydraulically locked against movement so that the roller 38, in any given position of the cylinder 34, hence of the wheel support shaft 15, serves as a fixed fulcrum for the forked arm 39. The rocking of the lever 74 will therefore rock the lever 75 about the pin 76 and so shift the control valve member 77 either to the right or to the left as selected. The delivery conduit 67 will then be placed in connection either with the conduit 55 or with the conduit 57 in order to shift the cylinder 34 along the rod 27. In so moving, the roller 38 carried by the cylinder 34 will turn the forked arm 39 which will exercise a follow-up movement by rocking the lever 75 about the pin 78 to return the valve member 77 to its original position at which connection between the delivery conduit 67 and either one conduit 55 and 57 will be cut off. Whenever delivery flow is permitted from the delivery conduit 67 into one or other of the conduits 55 and 57, the other of the conduits 55 and 57 will communicate with the reservoir through the corresponding section of the control valve 68 and through the return conduit 69.

It is to be noted that the eccentricity of the pin 25 with respect to the castoring axis, the length of the link 37, and the permitted length of travel of the cylinder 34 are such that the rotatable column 15 is permitted to turn or free castor through 360 degrees. Steering is effective in a typical case for approximately 60 degrees on either side of the midposition. It will also be noted that the second by-pass passage 58 remains effective to prevent excessive pressure from shock loads during steering as well as during free-castoring of the wheel.

Referring now to the modification shown in Fig. 7, a double acting hydraulic jack device 79 serves merely as a shimmy damper although it will be understood that by connecting it, as by conduits 55 and 57 in the form previously described, with a suitable hydraulic system it would also be used to effect steering throughout a limited range whilst permitting castoring to take place throughout the remainder of the turning range. In this arrangement the casing 80 of the jack device 79 is pivoted at one end about a pin 81 arranged parallel with and eccentrically of the axis 82 of the castorable column 83. The piston 84 of the jack device 79 is mounted on a rod 85 which is pivotally connected at 86 to a lever 87 which is fulcrumed at 88 and is connected at 89 by a link 90 with the column 83 about an eccentric axis 91. The piston 84 is formed with a through restriction 92. The proportions of the links and levers are such that 360 degrees castoring is permitted during which the piston 84 reciprocates within its cylinder 80 to operate as a dash-pot by virtue of a restriction 92. During castoring the cylinder 80 swings to and fro transversely about its pivotal attachment to the pin 81, which obviously necessitates that the above-mentioned fluid connections to the opposite ends of the cylinder be of a flexible type.

In the arrangement shown in Figure 8 the hydraulic jack device oscillates transversely about an end fulcrum as in Figure 7, but in this case the piston rod is anchored to the fulcrum and the cylinder is connected with the castorable column. As shown in barest detail, a double-acting jack device 93 has its piston rod 94 fulcrumed about a pin 95 on the casing or fixed part 96 of the mounting. The castorable column 97 is pivotally attached to the cylinder 98 of the jack device 93 about a pivot 99 disposed eccentrically of the castoring axis. As in the previous arrangement, the column 97 is capable of castoring through 360 degrees. The cylinder 98 is, however, extended to accommodate the self-centering spring 100 which is housed in a similar manner to the spring 43 of the Figures 1 to 6 arrangement. That is to say, when the cylinder is moved in one direction it carries one of the spring housings with it to compress the spring, and when the cylinder is moved in the opposite direction it carries the other spring housing with it. The spring 100 always acts to return the landing wheel into a predetermined angular alignment. Again the jack device 93 may be utilised to effect steering throughout a limited range by connecting with it a suitable hydraulic system as before.

The invention thus permits castoring throughout 360 degrees yet makes provision either for shimmy damping or for both shimmy damping and steering by means of a single double-acting jack by arranging the latter at the upper end of the rotatable part of the mounting. Hitherto it has been customary when steering alone is effected by jacks to employ two jacks at diametrically opposite parts of the steering column, one jack serving to turn the mounting clockwise and the other anti-clockwise.

I claim:

1. A castorable wheel mounting, comprising a castor shaft carrying the wheel, fixed support means supporting and guiding said shaft for rotation continuously through a 360° range, crank means fixed to said shaft eccentrically thereof for rotation conjointly therewith, double-acting hydraulic jack means having a piston and coacting cylinder one of which comprises a movable element pivotally connected to said crank means, and the other of which comprises a fixed element, displacement of said movable element relative to said fixed element accompanying rotation of said castor shaft throughout such range, restricted hydraulic fluid by-pass means communicating between opposite ends of the hydraulic jack cylinder to permit retarded displacement of said movable element effected by rotation of said castor shaft, and thereby damp shimmy of such shaft and the wheel, pressure-fluid conduit means connected to opposite ends of the hydraulic jack cylinder, and flow control means coacting with said conduit means to control delivery and discharge of pressure-fluid through said conduit means to and from opposite ends of the hydraulic jack cylinder selectively to displace said movable element thereby for steering.

2. The castorable wheel mounting defined in claim 1, wherein the cylinder of the hydraulic jack means comprises the movable element.

3. The castorable wheel mounting defined in claim 2, wherein the hydraulic jack means include a piston rod pivoted at one end thereof to the fixed support means such that reciprocation of the cylinder consequent upon rotation of the castor shaft is accompanied by transverse swinging movement of the jack means about the piston rod pivot.

4. The castorable wheel mounting defined in claim 1, wherein the cylinder comprises the movable element, and a link interconnecting such cylinder means and the castor shaft, and means fixing the piston transversely of the axis of the castor shaft.

5. An aircraft castorable and steerable wheel mounting adapted for connection to a hydraulic fluid pressure source, comprising a castor and steering shaft carrying the wheel, fixed support means guiding said shaft for rotation substantially through a 360° range, crank means fixed to said shaft eccentrically thereof for rotation conjointly therewith, double-acting hydraulic jack means having a piston and coating cylinder one of which comprises a movable element pivotally connected to said crank means, and the other of which comprises a fixed element, said elements coacting with said crank means for displacement of said movable element relative to said fixed element accompanying rotation of said castor shaft throughout said range, hydraulic fluid by-pass means communicating between opposite ends of the hydraulic jack cylinder to permit displacement of said movable element effected by rotation of said shaft, pressure-fluid conduit means connected to opposite ends of the hydraulic jack cylinder, and arranged for connection to the pressure source, control means coacting with said conduit means to control delivery and discharge of pressure-fluid from the pressure source through said conduit means to and from opposite ends of the hydraulic jack cylinder selectively to displace said movable element thereby for steering, and valve means in said by-pass means, operable to cut off said by-pass means, and thereby to restrain castoring of the wheel during supply of fluid pressure from such source to the hydraulic cylinder for steering.

6. The castorable and steerable wheel mounting defined in claim 5, and a flow restriction in the hydraulic fluid by-pass means retarding exchange of fluid between opposite ends of the hydraulic cylinder and thereby damping any wheel shimmy that may tend to develop when the by-pass is opened.

7. The castorable and steerable wheel mounting defined in claim 6, wherein the by-pass restriction is formed in the piston of the hydraulic jack means.

8. The castorable and steerable wheel mounting defined in claim 5, and centering spring means reacting between the hydraulic jack piston and cylinder to return the same to an initial position relative to each other corresponding to center position of the wheel connected to the movable element through the shaft and crank means.

9. The castorable and steerable wheel mounting defined in claim 5 wherein the hydraulic cylinder comprises the movable element and the piston is carried fixedly by the support means, and a link pivotally interconnecting the cylinder and the shaft for conjoint reciprocation and rotation thereof, respectively.

10. The aircraft castorable and steerable wheel mounting defined in claim 5, and a second by-pass interconnecting opposite ends of the hydraulic jack cylinder and by-passing the means for cutting off the first by-pass, and a pressure-relief valve normally closing said second by-pass but opening the same automatically in response to excessive surges of pressure therein as a result of turning shock loads on the wheel during steering and during castoring of the wheel.

11. An aircraft castorable and steerable wheel mounting adapted for connection to a hydraulic pressure fluid source, comprising a castor and steering shaft carrying the wheel, fixed support means guiding said shaft for rotation substantially through a 360° range, double-acting hydraulic jack means having a movable element pivotally connected to said shaft eccentrically thereof for displacement of said movable element and rotation of said castor shaft conjointly throughout said range, hydraulic fluid by-pass means communicating between opposite ends of the hydraulic jack cylinder to permit displacement of said movable element effected by rotation of said shaft, and thereby damp shimmy of such shaft and the wheel, pressure-fluid conduit means connected to opposite ends of the hydraulic jack cylinder and arranged for connection to the pressure source, control means coacting with said conduit means to control delivery and discharge of pressure-fluid from the pressure source through said conduit means to and from opposite ends of the hydraulic jack cylinder selectively to displace said movable element thereby for steering, means to supply and withhold pressure-fluid from the pressure source to and from said control means at will, and means, including a valve responsive to pressure-fluid so supplied from such source, to cut off said by-pass means, to restrain castoring of the wheel during supply of pressure-fluid from such source to the control means for steering.

12. The aircraft castorable and steerable wheel mounting defined in claim 11, and a second by-pass interconnecting opposite ends of the hydraulic jack cylinder and by-passing the valve, and a pressure-relief valve normally closing said second by-pass but opening the same automatically in response to excessive surges of pressure therein as a result of turning shock-loads on the wheel during steering and during castoring of the wheel.

GEORGE H. DOWTY.

REFERENCES CITED

The following references are of record in the file of this patent:

UNITED STATES PATENTS

| Number | Name | Date |
|---|---|---|
| 2,008,094 | Chester | July 16, 1935 |
| 2,254,260 | Arcier et al. | Sept. 2, 1941 |
| 2,336,567 | Potter et al. | Dec. 14, 1943 |
| 2,372,710 | Chisholm, Jr. | Apr. 3, 1945 |
| 2,393,110 | Kops et al. | Jan. 15, 1946 |
| 2,424,233 | Greenough | July 22, 1947 |